United States Patent
Borikar et al.

(10) Patent No.: US 11,625,335 B2
(45) Date of Patent: Apr. 11, 2023

(54) ADAPTIVE ADDRESS TRANSLATION CACHES

(71) Applicant: Cisco Technology, Inc., San Jose, CA (US)

(72) Inventors: Sagar Borikar, San Jose, CA (US); Ravikiran Kaidala Lakshman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/170,460

(22) Filed: Feb. 8, 2021

(65) Prior Publication Data

US 2021/0182212 A1    Jun. 17, 2021

Related U.S. Application Data

(63) Continuation of application No. 16/290,101, filed on Mar. 1, 2019, now Pat. No. 10,929,310.

(51) Int. Cl.
*G06F 12/1081*    (2016.01)
*G06F 12/12*    (2016.01)
*G06F 13/12*    (2006.01)

(52) U.S. Cl.
CPC .......... *G06F 12/1081* (2013.01); *G06F 12/12* (2013.01); *G06F 13/122* (2013.01); *G06F 2213/0026* (2013.01)

(58) Field of Classification Search
CPC .... G06F 12/1081; G06F 12/12; G06F 13/122; G06F 2213/0026
USPC ........................................................ 710/308
See application file for complete search history.

(56) References Cited

U.S. PATENT DOCUMENTS

| | | | |
|---|---|---|---|
| 7,415,575 B1 * | 8/2008 | Tong ..................... | G06F 12/122 711/E12.071 |
| 7,506,084 B2 | 3/2009 | Moerti et al. | |
| 7,617,377 B2 | 11/2009 | Moertl et al. | |
| 7,707,383 B2 | 4/2010 | Saripalli | |
| 7,886,112 B2 | 2/2011 | Ohtsuka | |
| 8,086,821 B2 | 12/2011 | Mukherjee et al. | |
| 8,127,082 B2 * | 2/2012 | McBride ............. | G06F 12/1027 711/E12.047 |

(Continued)

OTHER PUBLICATIONS

Address Translation Services Revision 1.1—Jan. 26, 2009; 54 pages (Year 2009).

(Continued)

*Primary Examiner* — Brian T Misiura
(74) *Attorney, Agent, or Firm* — Polsinelli

(57) ABSTRACT

Systems and methods provide for optimizing utilization of an Address Translation Cache (ATC). A network interface controller (NIC) can write information reserving one or more cache lines in a first level of the ATC to a second level of the ATC. The NIC can receive a request for a direct memory access (DMA) to an untranslated address in memory of a host computing system. The NIC can determine that the untranslated address is not cached in the first level of the ATC. The NIC can identify a selected cache line in the first level of the ATC to evict using the request and the second level of the ATC. The NIC can receive a translated address for the untranslated address. The NIC can cache the untranslated address in the selected cache line. The NIC can perform the DMA using the translated address.

18 Claims, 7 Drawing Sheets

(56) References Cited

U.S. PATENT DOCUMENTS

| | | | |
|---|---|---|---|
| 8,161,243 B1 | 4/2012 | Wagh et al. | |
| 8,521,912 B2 | 8/2013 | Aloni et al. | |
| 8,769,168 B2 | 7/2014 | Moertl et al. | |
| 8,850,159 B2 | 9/2014 | Carmona et al. | |
| 9,213,649 B2 * | 12/2015 | Koka | G06F 12/1072 |
| 9,336,158 B2 | 5/2016 | Manula | |
| 9,483,400 B2 | 11/2016 | McKinley | |
| 9,626,300 B2 | 4/2017 | Serebrin | |
| 9,632,948 B2 | 4/2017 | Franko | |
| 9,749,319 B2 | 8/2017 | Serebrin | |
| 10,031,857 B2 | 7/2018 | Menachem et al. | |
| 10,037,299 B1 | 7/2018 | Ramey et al. | |
| 10,048,881 B2 | 8/2018 | Sankaran et al. | |
| 10,102,149 B1 | 10/2018 | Appu et al. | |
| 10,114,761 B2 | 10/2018 | Smith et al. | |
| 10,664,400 B2 * | 5/2020 | Swaine | G06F 12/0808 |
| 11,507,515 B1 * | 11/2022 | Swaine | G06F 12/1054 |
| 2011/0022818 A1 | 1/2011 | Kegel et al. | |
| 2013/0145055 A1 | 6/2013 | Kegel et al. | |
| 2013/0262736 A1 | 10/2013 | Kegel et al. | |
| 2014/0201303 A1 | 7/2014 | Dalal et al. | |
| 2014/0281055 A1 | 9/2014 | Davda et al. | |
| 2016/0246540 A1 | 8/2016 | Blagodurov et al. | |
| 2018/0011651 A1 * | 1/2018 | Sankaran | G06F 12/1009 |
| 2018/0095906 A1 | 4/2018 | Doshi et al. | |
| 2018/0246815 A1 | 8/2018 | Smith et al. | |
| 2018/0246817 A1 | 8/2018 | Feehrer et al. | |
| 2019/0102326 A1 | 4/2019 | Agarwal et al. | |
| 2019/0138240 A1 | 5/2019 | Gayen et al. | |

OTHER PUBLICATIONS

PCI-Sig Address Translation Services—42 pages, Dated 2006 (Year 2006).

International Search Report and Written Opinion from the International Searching Authority, dated Jun. 16, 2020, 12 pages, for corresponding International Patent Application No. PCT/US2020/019977.

* cited by examiner

ADAPTIVE ADDRESS TRANSLATION CACHES

CROSS-REFERENCE TO RELATED APPLICATION

This is a continuation of U.S. Non-Provisional patent application Ser. No. 16/290,101, filed on Mar. 1, 2019, the full disclosure of which is hereby incorporated by reference in its entirety.

TECHNICAL FIELD

The subject matter of this disclosure relates in general to the field of computer memory, and more particularly, to systems and methods for optimizing utilization of an address translation cache.

BACKGROUND

A computing system can include an input/output (I/O) memory management unit (IOMMU) to provide address translation for direct memory access (DMA) to main memory of the computing system from an I/O device (e.g., network adapters, graphical processing units (GPUs), storage controller, etc.) and for memory protection from misbehaving devices by limiting areas of the main memory that the I/O device may access. The IOMMU can intercept DMA transactions and utilize I/O page tables to determine whether access is permitted and to resolve the actual physical address in the main memory that will be accessed. To further improve performance, the IOMMU may include an I/O Translation Lookaside Buffer (IOTLB) that can operate as a cache to speed up address resolution. An IOTLB cache-miss, however, can represent significant performance degradation (relative to an untranslated addressing scheme) because of the additional overhead required by a walkthrough of the I/O page tables.

To mitigate IOTLB cache-misses, an I/O device itself can include a device-side IOTLB (sometimes referred to as a device Translation Lookaside Buffer (TLB) or an Address Translation Cache (ATC)) and support Address Translation Services (ATS), as defined by Peripheral Component Interconnect-Special Interest Group (PCI-SIG®) and set forth in the Peripheral Component Interconnect Express (PCIe®) Base Specification. By implementing ATS in the I/O device, the ATC can offload at least some address resolution processing from the central processing unit (CPU) and/or IOMMU and increase the aggregate size of the IOTLB (e.g., IOMMU IOTLB plus ATC). However, current implementations of ATS have various drawbacks. For example, computing systems can be expected to execute more than a thousand applications and system images (e.g., virtual machines, containers, or other virtual partitions of a physical server) at a time but current implementations of ATS may be incapable of supporting these loads. In addition, ATS is a general specification intended to provide interoperability for all types of PCIe endpoints and may not be optimal for specific types of workloads, heterogeneous workloads, and certain types of I/O devices.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
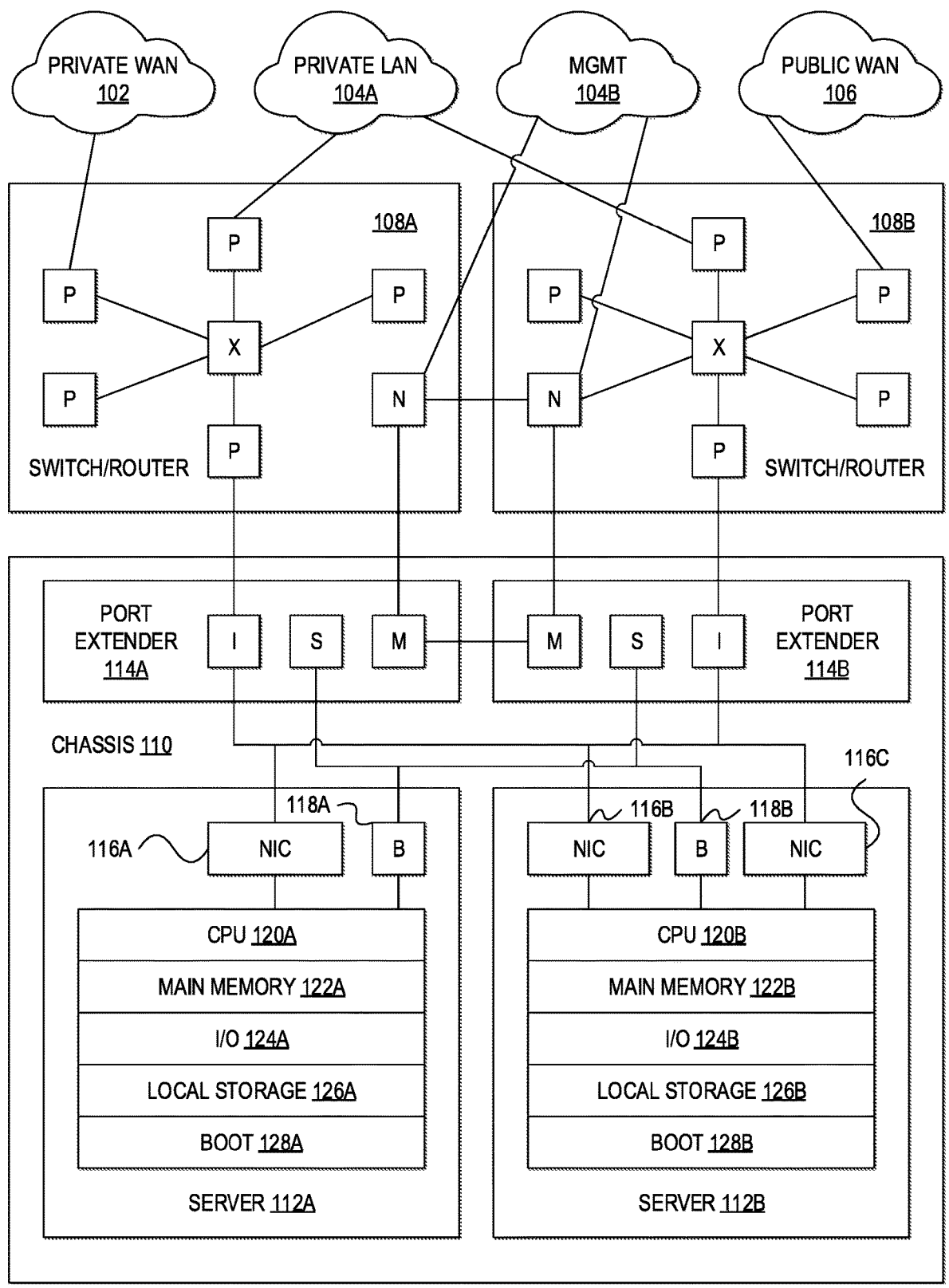
FIG. 1 illustrates a block diagram of an example of a network in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for optimizing utilization of an Address Translation Cache (ATC). A network interface controller (NIC) can write information reserving one or more cache lines in a first level of the ATC to a second level of the ATC. The NIC can receive a request for a direct memory access to an untranslated address in memory of a host computing system. The NIC can determine that the untranslated address is not cached in the first level of the ATC. The NIC can identify a selected cache line in the first level of the ATC using the request and the second level of the ATC. The NIC can receive a translated address for the untranslated address. The NIC can cache the untranslated address in the selected cache line. The NIC can perform the DMA using the translated address.

Example Embodiments

Virtualization can include various mechanisms for producing multiple emulated instances from a single physical instance of a computing resource (e.g., processing, memory, I/O, storage, networking, etc.). Virtualization can improve utilization of resources (e.g., maximal server capacity, minimal hardware costs, reduced energy usage, etc.), accelerate and simplify network and operations administration (e.g., system provisioning and deployment, system management, disaster recovery, and increase business flexibility (e.g., live migration of on-premise computing resources, simplified migration from on-premise computing to cloud computing and between different cloud providers, vendor lock-in avoidance, etc.). However, virtualization adds an additional software layer between virtual instances and hardware that can negatively affect performance. For example, Input/Output (I/O) can become a bottleneck in a virtualized system because of the overhead of the virtualization layer (e.g., hypervisor, container engine, or other virtualization software).

Certain approaches can be taken to improve I/O performance in a virtualized system. For example, the virtualized system can incorporate an IOMMU to safely provide direct memory access (DMA) to I/O devices. The IOMMU, however, can increase memory access latency due to the necessity of address translation for securing memory from misbehaving devices and for implementing virtual memory and other virtualization. An I/O Translation Lookaside Buffer (IOTLB) can reduce address resolution latency to an extent but an IOTLB cache-miss can significantly increase memory access latency because of the walkthroughs of I/O page tables to retrieve targeted physical addresses. In addition, the IOTLB is a limited, scarce resource and overreliance on the IOTLB can result in vendor lock-in due to the IOTLB being platform dependent.

Another technique for improving I/O performance in a virtualized system is I/O virtualization, such as Single-Root I/O Virtualization (SR-IOV). SR-IOV can allow multiple system images (e.g., virtual machines, containers, or other virtual partitions of a physical server) to share physical I/O devices and enable the system images to more directly interact with the physical I/O devices. Thus, the overhead of the virtualization layer (e.g., hypervisor, container engine, or other virtualization software) can be significantly reduced by the virtualization layer foregoing interception and processing of every I/O operation. Although SR-IOV can provide for direct pass-through of I/O tasks, the latency resulting from IOTLB cache-misses and page walkthroughs may nevertheless be unsuitable for hyper-scale workloads (e.g., thousands of system images concurrently executing in a single computing system). Further, even when a computing system runs a single system image, IOTLB cache thrashing can still occur if that system image executes thousands of applications, a small number of applications with I/O intensive workloads, and/or one or more applications that access several different regions of memory.

In addition to the limitations of scale for current approaches to I/O in virtualized systems, current approaches can also suffer from inflexibility to a wide variety of workloads. For example, IOTLB cache-misses can depend on the page size used by an application. Different applications may utilize different sized pages. High-performance computing (HPC) applications can have different Quality of Service (QoS) requirements from other applications. Different applications can also have different memory access patterns (e.g., variations in duration, rate, burstiness, etc.). Current systems cannot adapt to these heterogeneous workloads (e.g., varying number of system images, varying number of applications, applications having different-sized I/O workloads, applications having different priorities, applications having different I/O patterns, and other distinctions).

A strategy for reducing IOTLB cache thrashing is to incorporate an ATC in the I/O device and configuring the I/O device to implement ATS, as set forth by the PCI-SIG® in the PCI Express® Base Specification, which is incorporated herein by reference. The ATC can relieve address resolution latency to a degree but the ATC may not be effective for heterogeneous workloads at scale. Like the TLB of a CPU, the IOTLB of the IOMMU, or other caches, the size of the ATC may be limited because it can be a relatively expensive resource. Current cache replacement policies (e.g., Least Recently Used (LRU)) used to evict existing entries from the ATC can be "one size fits all" and static. Depending on the nature of the I/O workload(s), this inadaptability can degrade the performance of virtualized systems because every eviction can require issuance of a new page and cause thrashing of the IOTLB. This can be especially pronounced in a containerized computing system in which there can more than a thousand containers that require pass-through operations. Although a computing system may have the capability to support such hyper-scale workloads, the IOTLB (e.g., the IOMMU IOTLB and the ATC) can operate as a bottleneck.

Various embodiments of the present disclosure can overcome these and other deficiencies of the prior art by utilizing an ATC that can intelligently adapt to heterogeneous workloads and applying one or more ATC entry replacement policies that can depend upon a number of different criteria, such as user preference, rate limit, quality of service (QoS), and a type of workload, among other information identifying or distinguishing a set of network traffic.

In some embodiments, a user can carve out a number or percentage of entries of an ATC based on preference. For example, the user may request a NIC (via a network management system or other software) to set aside seventy-five percent of the ATC for a virtual NIC (VNIC) identifier and process address space identifier (PASID) associated with an HPC application. In response, the NIC can reserve the specified number or percentage of entries for the specified VNIC identifier and PASID. Other user preferences that can dictate ATC entry replacement policy may depend on the capabilities of the NIC, such as if the NIC includes hardware support for traffic classification, packet matching, Transport Control Protocol (TCP) offload, and so forth. If the NIC is capable of providing these features, the user can define more granular ATC entry replacement policies based on traffic class, flow matching, packet matching, deep packet inspection, and other information identifying or distinguishing network traffic.

In some embodiments, a NIC can receive QoS information to reserve segments of an ATC to prioritize different QoS classes. For example, the NIC can set bandwidths for certain types of applications and devise the ATC entry replacement policy accordingly. In one embodiment, a QoS policy that allows traffic for a certain application to be dropped can cause the cause the NIC to unreserve ATC entries (if any) associated with that traffic because the QoS policy tolerates dropping of those packets. In another embodiment, if there is remote direct memory access (RDMA) or HPC traffic running on a set of VNICs and PASIDs that are designated as no-drop traffic, then the NIC may reserve a certain percentage of the ATC for this set of VNICs and PASIDs. If there is contention for the reserved portion of the ATC among this set of VNICs and PASIDs, the NIC may apply Deficit weighted round robin (DWRR) replacement or other suitable cache replacement algorithm for selecting the entries in the ATC to evict. More granular QoS policies can also be applied depending on the capabilities of the NIC, such as QoS policies based on traffic class, flow matching, packet matching, deep packet inspection, and so forth.

In some embodiments, a NIC can receive rate limits and determine an ATC entry replacement policy based on the rate limits. For example, if there is a rate limit set for a certain group of VNICs, then the NIC can use the same cache replacement algorithm (e.g., DWRR, Least Recently Used (LRU), etc.) to determine whether ATC entries associated with this group should be prefetched and/or whether to immediately invalidate the ATC entries associated with this group. As another example, the NIC may forego requesting the ATC for translated addresses for this group of VNICs if their rate limit is set very low. More granular rate limit policies can also be applied depending on the capabilities of the NIC, such as rate limit policies based on traffic class, flow matching, packet matching, deep packet inspection, and so forth.

In some embodiments, the NIC may evaluate the characteristics of workloads policies for determining ATC entry replacement policy. For example, the NIC can monitor the traffic of a set of VNICs and use counters to quantify the number of hits for each ATC entry. Then, the NIC can determine an eviction scheme on the basis of the counts. More granular workload-based policies can also be applied depending on the capabilities of the NIC. For example, the NIC may support network monitoring capabilities and can leverage these capabilities to create more precise workload-based policies. Alternatively or in addition, the NIC can adapt the ATC to make the best use of any of the above policies to provide the best throughput for a wide variety of workloads.

In this manner, certain categories of traffic can receive the highest quality of service while the computing system can improve utilization of the IOTLB (e.g., the IOMMU TLB and the ATC), and other resources. For example, the depth of the ATC, the cost of the computing system, and power consumption can be directly related to one another; a deeper ATC can correspond to a higher cost for the computing system and greater power consumption. Thus, improved utilization of the ATC can reduce hardware and energy costs. Numerous other functions and advantages are described and suggested below as may be provided in accordance with the various embodiments.

FIG. 1 illustrates a block diagram of an example of a network 100 for deploying various embodiments of the present disclosure. One of ordinary skill in the art will understand that, for the network 100 and any system discussed in the present disclosure, there can be additional or fewer nodes, devices, links, networks, or components in similar or alternative configurations. Various embodiments may include different numbers and/or types of clients, networks, nodes, cloud components, servers, software components, devices, virtual or physical resources, configurations, topologies, services, appliances, deployments, network devices, etc. The illustrations and examples provided in the present disclosure are for conciseness and clarity.

In this example, the network 100 includes a private wide-area network (WAN) 102 (e.g., dark fiber, Multiprotocol Label Switching (MPLS), Cisco® Software Defined-WAN (SD-WAN) fabric, etc.), a first private local area network 104A (e.g., Cisco Software Defined-Access (SD-Access) fabric, Cisco® Application Centric Infrastructure (Cisco ACI™) fabric, Cisco HyperFlex™ HX Data Platform, etc.) and a second private network or management network 104B (collectively, 104), a public WAN 106 (e.g., the Internet, Long Term Evolution (LTE), etc.), network devices 108A and 108B (collectively, 108), and a server chassis 110. The server chassis 110 is a computing infrastructure device that can be used to interconnect physical servers in various form factors (e.g., rack servers, blade servers, and other high-density server configurations) with other network elements. The server chassis 110 can provide power, cooling, connectivity, and mechanical support for physical servers, such as servers 112A and 112b (collectively, 112) and network devices, such as switches, routers, network appliances (e.g., load balancers, deep packet inspectors, firewalls, etc.), port extenders (e.g., port extenders 114A and 114B (collectively, 114)), and so forth. An example of an implementation of the server chassis 110 is the Cisco Unified Computing System™ (Cisco UCS®) Blade Server Chassis. The server chassis 110 can include a number of slots (e.g., 8 half-width slots, 4 full-width slots, or other capacities) for receiving the servers 112. The server chassis 110 can reduce the number of physical components and the amount of cabling relative to conventional rack or blade systems, integrate with existing infrastructure for centralized management, and operate more efficiently with respect to energy consumption than conventional systems.

In the network 100, the server 112A can be an example of a half-width or half-slot server and the server 112B can be an example of a full-width or full-slot server. Other embodiments may utilize servers having other types of form factors, including some embodiments with servers that do not require a chassis. For example, various embodiments can include a server that is a standalone device communicatively coupled to the server chassis 110 or to the network devices 108. Various types of interconnections and buses can provide the communicative coupling, including any wired or wireless interconnection line, network, connection, bundle, single bus, multiple buses, crossbar network, single-stage network, multi-stage network, or other conduction medium operable to carry data between parts of a computing device or between computing devices.

The server 112A can include a NIC 116A, baseboard management controller (BMC) 118A, a CPU 120A, main memory 122A, an I/O subsystem 124A, local storage 126A, and a boot subsystem 128A. The NIC 116A can connect the server 112A to other separate and discrete network elements (e.g., NICs 116B and 116C, the port extenders 114, the network devices 108, the networks 102, 104, and 106, etc.) and logically separate elements of the server 112A (e.g., virtual machines, containers, or other virtual partitions of a physical server) (collectively, virtualized server). A person of ordinary skill will appreciate that some of these elements may be combinable (e.g., an I/O subsystem can include a network interface) or further divisible (e.g., cache memory can be distinguishable from main memory) but the server 112A can include the above components for purposes of simplicity and clearness.

The BMC 118A can monitor and manage the state of the server 112A. The BMC 118A can include a specialized service processor (not shown) and firmware (not shown) to provide management and monitoring capabilities independently from the CPU 120A. In some embodiments, the BMC 118A can be reachable even when the CPU 120A may be powered off or non-operational. In some embodiments, the BMC 118A can supports the standards defined in the Intelligent Platform Management Interface (IPMI) specification. An example of an implementation of the BMC 118A is Cisco® Integrated Management Controller (CIMC). Cisco® CIMC is compliant with the IPMI specification but can also provide additional functionality for providing unified monitoring and management of multiple computing systems. For example, Cisco® CIMC can provide diagnostic and health monitoring features, such as support for Simple Network Management Protocol (SNMP); Extensible Mark-up Language (XML) application programming interface (API) event subscription and configurable alerts; system event logging; audit logging; monitoring of field-replaceable units (FRUs), hard disk drive (HDD) faults, dual inline memory module (DIMM) faults, NIC media access control (MAC) address, CPU, and thermal faults; configurable alerts and thresholds; watchdog timers; Redundant Array of Independent Disks (RAID) configuration and monitoring; predictive failure analysis of HDD and DIMM; support for converged network adapters (CNAs); and support for Network Time Protocol (NTP).

In some embodiments, the BMC 118A can operate in a standalone mode to provide users with full control of the server, allowing an administrator to perform server management tasks including powering on, powering off, power-cycling, resetting, and shutting down the server; toggling the locator light-emitting diode (LED); configuring the server boot order; viewing server properties and sensors; configuring out-of-band storage; managing remote presence; managing firmware; creating and managing local user accounts and enabling authentication through Active Directory and Lightweight Directory Access Protocol (LDAP); configuring network-related settings, including NIC properties, Internet Protocol (IP) version 4 (IPv4), IP version 6 (IPv6), virtual local area networks (VLANs), and network security; configure communication services, including Hypertext Transfer Protocol (HTTP), Secure Shell (SSH), and IPMI over Local Area Network (LAN); managing certificates; configuring platform event filters; and monitoring faults, alarms, and server status.

In some embodiments, the BMC 118A may also provide features such as a Hypertext Mark-up Language version 5 (HTML5) and Keyboard, Video, and Mouse (KVM) User Interface (UI); Redfish support; and XML API transactional support. HTML5 and KVM can provide users with a simplified UI, and can eliminate the need for Java to use CIMC. Redfish is an open industry standard specification and schema that specifies a Restful Stateful Transfer (REST) API and uses Javascript Object Notation (JSON) and Open Data Protocol (OData) to help customers integrate solutions within their existing tool chains. XML and REST API transactional support can enable configuration of multiple managed objects in a single transaction, allowing for quicker, simpler deployments.

In some embodiments, the BMC 118A can perform configuration and management services while the server 112A is in a low-power state, such as a standby state. In contrast, the CPU 120A, main memory 122A, local storage 126A, etc., may require the server 112A to be in a relatively high power state. In general, a low-power state may include a state where the server 112a may not be completely powered on and may not provide all or substantially all of its full functionality, whereas a high-power state can be a state where the server 112A may be powered on and can provide all or substantially all of its capabilities, less capabilities that are specifically disabled for purposes of management and configuration.

The CPU 120A can connect to other elements of the server 112A via one or more interconnects or buses, and can directly perform instructions stored in the main memory 122A and indirectly perform instructions stored in the local storage 126A, a Cisco ACI™ data center, a Cisco HyperFlex™ HX Data Platform, and/or other storage system. The CPU 120A can include any combination of hardware, software, and/or firmware providing programmable logic. Examples of implementations of the CPU 120A can include Advanced Reduced Instruction Set Computer (RISC) Machine (ARM), Microprocessor without Interlocked Pipeline Stages (MIPS), PowerPC, Scalable Processor Architecture (SPARC), or the x86 processor provided by Intel Corp® or Advanced Micro Devices® (AMD®), among others.

The main memory 122A can comprise a collection of random access memories (RAMs) or integrated circuits (ICs) that generally allow for access to data stored in the ICs in any order, in constant time, regardless of the data's physical location. RAMs can include Static RAMs (SRAMs); Dynamic RAMs (DRAMs); and Synchronous DRAMs (SDRAMs). SRAMs can be very fast generally but typically have a smaller capacity (e.g., a few megabytes) than DRAMs. SRAMs may be characterized as static because they can have a chip structure that maintains data as long as there is power to the SRAMs. However, SRAMs may generally not be large enough to operate as the main memory of a server. Instead, main memory typically comprises DRAMs. DRAMs can store data on capacitors within an integrated circuit. DRAMs may be characterized as dynamic because capacitors can discharge over time due to leakage currents and can require recharging to avoid data loss.

SDRAMs have a synchronous interface, meaning that their operation can synchronize with a clock signal. The clock can drive an internal finite state machine that "pipelines" memory accesses (e.g., SDRAM can accept a new memory access before it has finished processing the previous one). Pipelining can improve the performance of SDRAMs relative to conventional DRAMs. The first implementation of SDRAM, single data rate (SDR), specified transfer of a single unit of data per clock cycle. The next implementation of SDRAM, double data rate (DDR), could achieve nearly twice the bandwidth of SDR by transferring data on the rising and falling edges of a clock signal, without increasing clock frequency. DDR evolved into second generation DDR (DDR2), third generation DDR (DDR3), fourth generation DDR (DDR4), and so forth. DDR2 can be capable of operating the external data bus at twice the data rate of DDR by improved bus signaling. DDR3 improves upon DDR2 by reducing operating voltage, increasing memory density, and increasing memory bandwidth. DDR4 can include improvements in power consumption and data transfer speed.

In some embodiments, the main memory 122A can include multiple memory chips assembled together on small boards known as dual inline memory modules (DIMMs). A DIMM can have a rank, an arrangement of chips that produce a specified number of bits of useful data (e.g., 64, 128, etc.). Thus, a DIMM can be single-rank, double-rank, quad-rank, and so forth. A memory controller can select a memory rank by chip select instead of by address bits. For example, a memory controller can include up to eight separate chip selects and may be capable of supporting up to eight ranks.

SDRAM DIMMs can include Unbuffered DIMMs (UDIMMs) and registered DIMMs (RDIMMs). In UDIMMs, the memory chips may directly connect to the address and control buses, without any intermediate component. RDIMMs can have additional components, registers, placed between the incoming address and control buses and the SDRAM components. These registers can add one clock cycle of delay but can reduce the electrical load on the memory controller and allow more DIMMs per memory controller.

The I/O subsystem 124A can include peripheral devices and the interfaces for connecting the peripheral devices to the server 112A. The I/O subsystem 124A can generally transfer data from the main memory 122A to accessible peripheral devices and vice versa. Historically, computing systems provided I/O using buses compatible with the Peripheral Component Interconnect (PCI) standard, a standard developed to interconnect peripheral devices to a computing system. Various embodiments may also support PCIe. PCIe can specify point-to-point connectivity resulting in a tree structure topology with a single root complex. The root complex can be responsible for system configuration, enumeration of PCIe resources, and management of interrupts and errors for the PCIe tree. A root complex and its endpoints can share a single address space and communicate through memory reads and writes, and interrupts. PCIe can connect two components with a point-to-point link. Links can comprise N lanes (e.g., a ×16 PCIe link can comprise N lanes), and each lane can include two pairs of wires: one pair for transmission and one pair for reception. Each lane can connect to a PCIe endpoint, PCIe switch, or a PCIe to PCI bridge.

The local storage 126A can comprise non-volatile memory and can be a Hard Disk Drive (HDD), a Non-Volatile Memory Express (NVMe) drive, a Solid State Device (SSD), or other type of computer readable media which can store data that is accessible by a computing system, such as Universal Serial Bus (USB) flash memory drives, flash memory cards or sticks, optical disks, magnetic tape, standalone RAM disks, read only memory (ROM), and hybrids thereof.

The boot subsystem 128A can include software and/or firmware for performing hardware initialization upon the server 112A powering on or booting up, and to provide runtime services for operating systems and applications. The boot subsystem 128A may initialize and test the hardware components of the server 112A. The boot subsystem 128A can also load one or more operating systems from the local storage 126A, networks 102, 104, and 106, or other storage location into the main memory 122A. In addition, the boot subsystem 128A can discover and setup one or more peripheral devices for access by the CPU 120A. In some embodiments, the server 112A may store the boot subsystem 128A as one or more boot images in a peripheral memory device connected to the server 112A. Alternatively or in addition, the networks 102, 104, or 106 may store one or more boot images from which the server 112A can retrieve the boot image(s). Multiple boot images can represent different hardware, software (e.g., operating systems, applications, etc.), and/or firmware configurations for the server 112A. Examples of implementations of the boot subsystem 128A can include basic input/output system (BIOS) for the x86 architecture or the Unified Extensible Firmware Interface (UEFI) or a bootloader for the ARM architecture.

In some embodiments, the BMC 118A may program and/or execute the boot subsystem 128A to configure two physical Ethernet links to combine them into one double-capacity Ethernet interface that can mask link failures (at the cost of halving capacity); configure an Ethernet link to split it into an out-of-band management Ethernet interface with its own MAC address for exclusive use by the BMC 118A and one or more in-band Ethernet interfaces with different MAC addresses; configure a group of disks to organize them as a RAID configuration to form one or more fault-tolerant disks; configure PCIe devices to expose them or hide them from one or more operating systems of the server 112A; and monitor and manage power supplies, voltages, clocks, CPU speed, temperatures, and fans.

In some embodiments, the BMC 118A may also program and/or execute the boot subsystem 128A to configure memory controllers to limit access to certain portions or ranges of the main memory 122A to certain processors of the CPU 120A. For example, the server 112A may include multiple memory controllers and multiple processors (e.g., multiple sockets and/or multiple cores per processor) and the BMC 118A may program and/or execute the boot subsystem 128A to limit the access of certain processors to particular sections of memory to effectively partition the memory among the processors. Alternatively or in addition, the BMC 118A can program and/or execute the boot subsystem 128A to limit the access of certain cores to specific portions of memory and control whether the cores can interrupt one another. In some embodiments, the BMC 118A may also program and/or execute the boot subsystem 128A to control whether certain virtual or physical peripheral devices are accessible to specific processors or cores. In some embodiments, the BMC 118A can load different boot images for each partition of processors and/or cores and thereby each partition can bootstrap independently. In this manner, the BMC 118A can create a number of segregated resource groups with each group comprising one or more processors or cores, a memory range, and one or more accessible peripheral devices (and/or a PCIe address range). Thus, the BMC 118A can perform operations similar to a conventional hypervisor without the overhead that may come with operating a host operating system and a guest operating system. This approach may be also an improvement upon containerization because the server 112A is not necessarily limited to a single operating system.

The full-slot server 112B can include the NICs 116B and 116B, a BMC 118B, a CPU 120B, main memory 122B, I/O subsystem 124B, local storage 126B, and boot subsystem 128B. One of ordinary skill in the art will appreciate that the full-slot server 112B can be similar in many respects to the half-slot server 112A. However, the full-slot server 112B can include more computing resources than the half-slot server 112A. For example, the full-slot server 112B can include more processors (and/or cores), more DIMMs, and more I/O interfaces (including network interfaces), thus providing greater processing power, memory, and networking capabilities relative to the half-slot server 112A.

The servers 112 can connect to the port extenders 114 via the NICs 116a. A port extender, standardized by the Institute of Electrical and Electronics Engineers (IEEE) 802.1Qbh protocol, can operate as an access device for use in NICs, blade switches, top-of-rack (TOR) switches, hypervisors, SR-IOV adapters, virtual switches, and so forth. A port extender can attach to a MAC port of an 802.1Q bridge (e.g., a controlling bridge) to provide additional MAC ports (downlink interfaces) that can operate as logical ports of the 802.1Q bridge to which the port extender attaches. Packets can flow from a port extender through the controlling bridge to allow consistent forwarding and policy enforcement for traffic. The controlling bridge can operate as a logically centralized management point for its collection of port extenders. Examples of implementations of the port extenders 114 can include Cisco® Fabric Extender (FEX) Technology, such as the Cisco Nexus® Fabric Extenders (FEX) for providing additional ports for TOR switches, Cisco UCS® Fabric Extenders for providing additional ports for the Cisco UCS® Blade Server Chassis, Cisco® Adapter Fabric Extender (Adapter FEX) for providing additional ports for a server, and the Cisco® Data Center Virtual Machine Fabric Extender (VM-FEX) for providing additional ports for virtual machines.

The port extenders 114 can each include interconnect infrastructure I, chassis manager M, and chassis management switch S. The interconnect infrastructure I can operate as a bridge between the servers 112 and switch/routers 108 and implement the data plane of the port extenders 114. Examples of implementations of the interconnect infrastructure I can include Cisco® FEX application specific integrated circuits (ASICs), such as Redwood and Woodside.

The chassis manager M can interact with network-wide manager N in the switch/routers 108 and the BMCs 118 in the servers 112. The chassis manager M can perform server discovery and sequencing, power management, temperature monitoring, and fan control looping. In some embodiments, when there are multiple port extenders in a server chassis, as in the example of FIG. 1, the chassis managers M may form a cluster with one manager in an active state and another in an inactive state according to a high-availability algorithm. For example, there can be a serial interface between the chassis managers M for receiving heartbeats between the two managers. Failover can occur either by failure to detect a heartbeat or unplugging of the active chassis manager. The network-manager N may also force a fail-over. Examples of implementations of the chassis managers M include Cisco® Chassis Management Controller (CMC) ASICs. The chassis manager switch S can provide connectivity to the BMCs 118 present on the servers 112. Examples of implementations of the chassis manager switch S can include Cisco® Chassis Management Switch (CMS) ASICs.

The port extenders 114 can connect the server chassis 110 to the switches/routers 108A and 108B (collectively, 108). The switches/routers 108 can operate as spine switches in a spine-and-leaf topology; aggregation/distribution switches and/or core switches in three-tier, multi-tier, or fat tree topologies; a Level 1+ switch in a BCube network topology; or other switch/router in a suitable network topology (e.g., DCell, CamCube, FiConn, Jelly fish, Scafida, etc.). Examples of implementations of the switch/routers 108 can include Cisco UCS® Fabric Interconnects, Cisco Catalyst® switches, Cisco Nexus® switches, Cisco® Industrial Ethernet switches, Cisco Meraki™ or Meraki® switches/routers, Cisco® Integrated Services Routers (ISR), Cisco® Network Convergence System (NCS) routers, Cisco® Aggregation Services Routers (ASR), Cisco® Industrial ISRs, and Cisco® Connected Grid Routers, among others.

One or more of the switches/routers 108 can include port controller ASICs P, crossbar fabric ASIC X, and network-wide manager agent N. The port controller ASICs P can control a small group of ports (e.g., 4, 8, 16, etc.) for processing packets upon ingress or egress for managed ports. The port controller ASICs P can also handle forwarding decisions between ports. Examples of implementations of the port controller ASICs P can include Cisco® Unified Port Controller (UPC) ASICs.

The crossbar fabric ASIC X can operate as a bridge between the port controllers P, and can manage packet switching and scheduling. That is, the crossbar fabric ASIC X can couple a port controller for an ingress port to the port controller for an egress port to enable traffic flow between the ports. Examples of implementations of the crossbar fabric ASIC X can include Cisco® Unified Crossbar Fabric (UCF) ASICs.

The network-wide manager agent N and network management appliances located in the management network 104B (collectively, network management system) can comprise hardware, software, and/or firmware for monitoring and managing server, network, and storage infrastructure of the network 100. The network management system can provision server, fabric, and storage resources as well as perform device discovery, inventory, configuration, diagnostics, monitoring, fault detection, auditing, and statistics collection. For example, the network management system can automatically detect, inventory, manage, and provision system components added to or changed in the network 100. The network management system can also manage clustering, switch redundancy, and otherwise ensure high availability for server, network, and storage resources in a data center and/or a remote network or cloud. Examples of implementations of the network management system can include Cisco® Digital Network Architecture (DNA™) Center, Cisco® SD-WAN vManage, Cisco ACI™, Cisco® Application Policy Infrastructure Controller (APIC), Cisco Meraki™ or Meraki® Dashboard, Cisco One™, Cisco Intersight™, Cisco UCS® Central, Cisco UCS® Manager, Cisco UCS® Director, Cisco® Integrated Management Controller (IMC) Supervisor, Cisco Prime®, Cisco CloudCenter®, Cisco® Container Platform, Cisco® Intelligent Automation for Cloud, Cisco® Intercloud Fabric, Cisco® Network Services Manager, Cisco Prime® Network Services Controller, Cisco® Virtualized Infrastructure Manager, Cisco® Data Center Network Manager, Cisco® Dynamic Fabric Automation, Cisco® Fabric Manager, Cisco® Fog Director, Cisco Network Director®, Cisco Firepower® Management Center, Cisco® Defense Orchestrator, Cisco® Security Manager, or other system for monitoring and managing multiple servers, the network fabric, and/or server storage.

The switches/routers 108 can support various types of traffic and include various types of ports and port controllers for connecting the servers 112 to other networks, such as the networks 102, 104, and 106, or any communicative platform operable to exchange data or information within or between computing systems (e.g., Internet, ad-hoc local network, Packet Data Network (PDN), LAN, Metropolitan Area Network (MAN), WAN, Wireless Local Area Network (WLAN), Virtual Private Network (VPN), intranet, or any other appropriate architecture or system that facilitates electronic communications). For example, the switches/routers 108 can include a number of 40 Gbps Quad Small Form-Factor Pluggable (QSFP) or QSFP+ ports that can operate at native-40-Gbps speed, or that can operate as four 10-Gbps ports (e.g., by inserting a QSFP-to-4 small form factor plus pluggable (SFP+) breakout cable) for handling Ethernet/IP traffic (e.g., traffic to/from a LAN), Fibre Channel (FC) or Fibre Channel on Ethernet (FCoE) ports for handling block storage traffic (e.g., traffic to/from storage area networks (SANs)), and serial ports for handling management traffic (e.g., traffic to/from the management network 104B) and inter-process communications (IPC) (e.g., high availability, clustering, virtualization platform services, etc.).

Figure 2A:
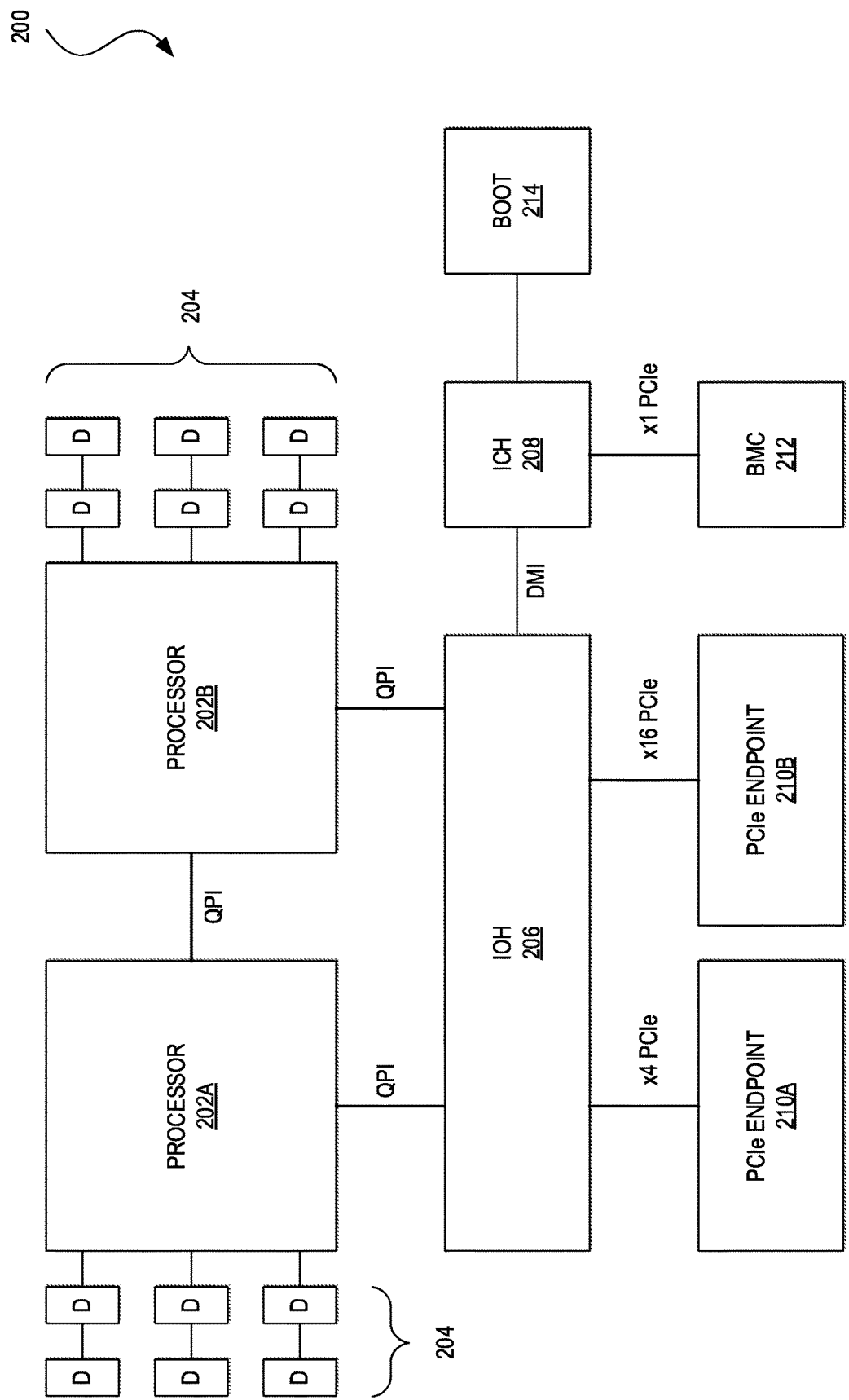
FIGS. 2A-2B illustrate block diagrams of examples of computing systems in accordance with some embodiments.
Figure 2B:
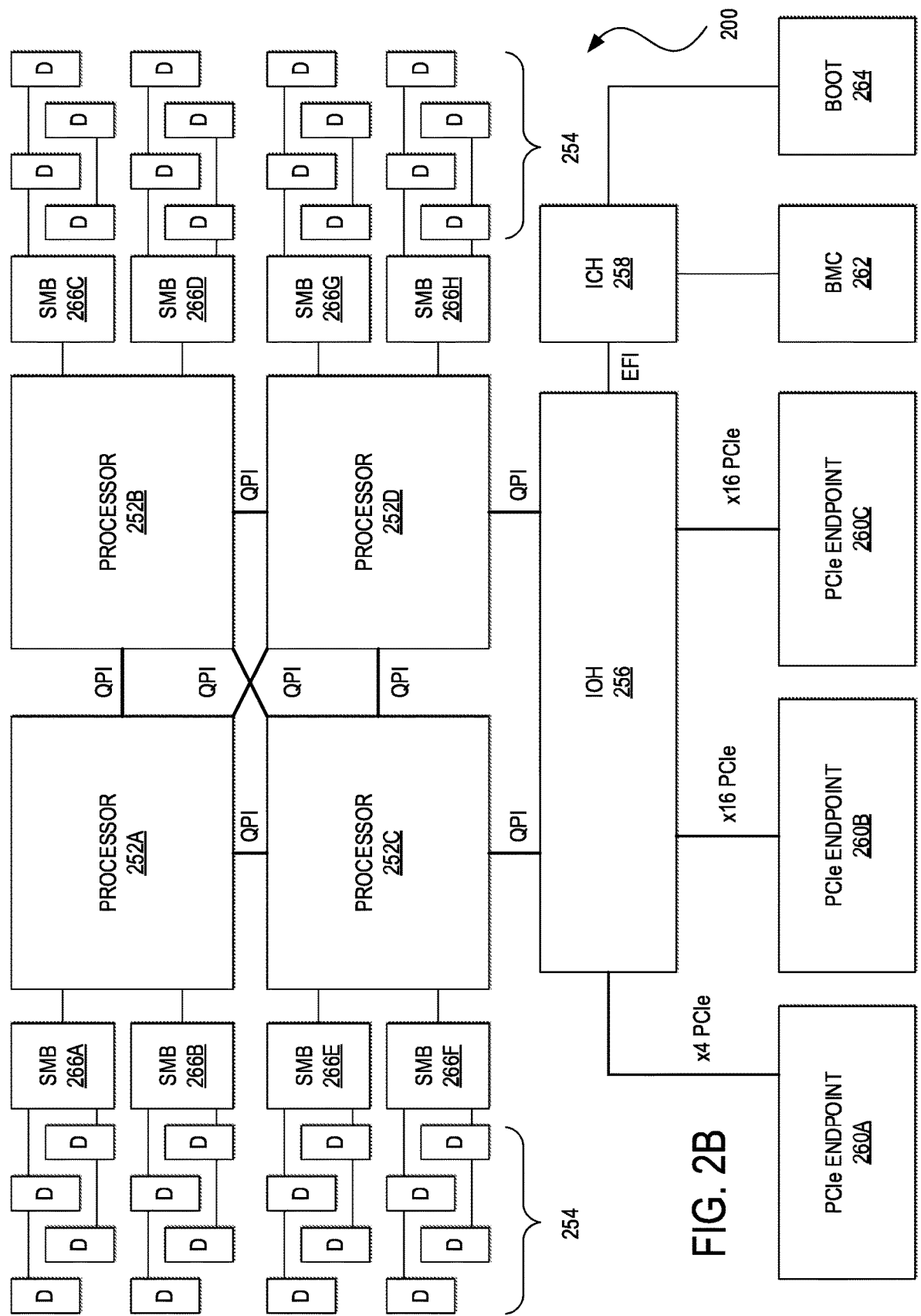

FIG. 2A and FIG. 2B illustrate block diagrams of examples of computing systems 200 and 250 for implementing various embodiments of the present disclosure. In this example, computing systems 200 and 250 can be respective implementations of the servers 112A and 112B. The present disclosure provides additional details regarding each of the components in the computing systems 200 and 250 in more detail below. However, one skilled in art will understand that the computing systems 200 and 250 are possible configurations and that other configurations with more or fewer components are also possible.

In FIG. 2A, the computing system 200 may be an example of a half-slot, two-socket server including processors 202A and 202B (collectively, 202). Sockets are mounting/interconnection structures for installing processors on a printed circuit board (PCB) or mother board of a computing system. Multiple sockets can provide for customization of a server motherboard by enabling mounting of processors using different clock speeds and/or amounts of power. Each processor 202 can include one or more cores (e.g., 2, 4, 6, 8, etc.) (not shown), each of which can replicate a basic CPU. Each core may be associated with a Level 1 (L1) cache (not shown). Caches are small fast memories that can reduce the average time to access main memory. The cores generally share a larger Level 2 (L2) or Level 3 (L3) cache, a bus or interconnection interface, and external die connections. The number of processors of a computing system is the product of the number of sockets and the number of cores per socket. For example, the computing system 200 includes two sockets and can include four cores per socket for a total of eight processors. Example of implementations of the processor 202A or 202B can include the Intel Core™, Intel Xeon®, AMD Epyc™, AMD Opteryon™, AMD Ryzen™, AMD Athlon™ processors, or other server processors.

The processors 202 can connect to one another and to I/O Hub (IOH) 206 (sometimes also referred to as a chipset) by QuickPath Interconnects (QPIs). The QPIs can comprise multiple high-speed uni-directional links for interconnecting the processors 202 and the IOH 206 or similar computing system element and integrating multiple distributed memory controllers for multiple cores of the processors 202. The cores inside a socket may share integrated memory controllers (IMCs) (not shown) that have multiple memory interfaces (i.e., memory buses). The IMCs may have various external connections, such as DDR3 or DDR4 memory (or other suitable memory) channels for connecting the processors 202 to main memory 204 (e.g., DDR3, DDR4, or other suitable memory). IMCs and cores in different sockets can talk to one another using QPI. In some embodiments, the processors 202 may also have full access to the memory of every other processor of the computing system 200 while maintaining cache coherency using a cache-coherent Non-Uniform Memory Architecture (NUMA). A computing system that implements QPI can achieve global memory reachability (or reachability by one socket to memory of another socket) using an internal crossbar router in the socket. Other embodiments may implement interconnections using other types of buses or interconnections, such as front-side buses (FSBs), Dual Independent Buses (DIBs), Dedicated High-Speed Interconnect (DHSI), and so forth.

The IOH 206 can connect the processors 202 to an I/O Controller Hub (ICH) 208 (sometimes also referred to as a Southbridge) using a Direct Media Interface (DMI) interconnection and PCIe endpoints 210A and 210B (collectively, 210) using PCIe interconnections. Examples of implementations of the IOH 206 can include Intel®, AMD®, and Nvidia® chipsets. In this example, the PCIe endpoint 210A can be a storage controller to connect the computing system 200 to storage devices (e.g., HDDs, NVMe drives, SSDs, etc.) (not shown). A storage controller can support Serial Attached Small Computer System Interface (SAS), Serial Advanced Technology Attachment (SATA), PCIe, or other data transfer rates, and integrate mirroring and striping functions to provide different RAID availability levels for internal drives. The PCIe endpoint 210B can be a NIC for exchanging network data between the computing system 200 and other network devices (e.g., the port extenders 114, the switches/routers 108, etc.). Other types of PCIe endpoints can include graphic cards, graphics processing units (GPUs), Fibre Channel host bus adapters, and other add-in cards.

In some embodiments, the IOH 206 can include an IOMMU (not shown) to facilitate directory memory access (DMA) transactions by the PCIe endpoints 210. The IOH 206 may also include one or more IOTLBs (not shown) to reduce the latency of address resolution. In addition, the IOH 206 can include remapping hardware (not shown) for supporting I/O virtualization translation of I/O transactions.

The ICH 208 can connect the computing system 200 to relatively low-speed peripheral devices (not shown) (e.g., peripheral devices slower than the PCIe endpoints 210), the BMC 212, and the boot subsystem 214. In this example, the ICH 208 can connect to the BMC 212 via a PCIe ×4 link. The BMC 212 can provide management access to the computing system 200 prior to the loading of an operating system, and can operate as an aggregation point for server hardware. In some embodiments, the BMC 212 can have two integrated Ethernet connections (not shown) or other out-of-band channels connected in a redundant manner to management components of access devices (e.g., the chassis management switches S). The boot subsystem 214 can include software or firmware for initializing hardware upon powering on or booting up the computing system 200 (e.g., BIOS, UEFI, bootloader, etc.) or other management software and/or firmware executed prior to loading of one or more operating systems of the computing system 200.

In FIG. 2B, the computing system 250 may be an example of a full-slot, four-socket server including processors 252A, 252B, 252C, and 252D (collectively, 252). Each processor 252 can include one or more cores (e.g., 4, 6, 8, etc.) (not shown), each of which can represent a discrete processing element. In this example, each processor 252 can include 4 cores such that the CPU of the computing system 250 includes a total of 16 processors. The processors 252 can be fully interconnected with one another by QPIs. The processors can also connect to IOH 256 by QPIs. In other embodiments, the processors 252A and 252B may connect to a second symmetrical IOH that can enable such a computing system to include additional memory and/or PCIe slots.

Each processor 252 can also connect to one or more serial memory buffers (SMBs) 266 using Serial Memory Interface (SMI) links. Each SMB 266 can connect to one or more DIMMs (e.g., DDR3, DDR4, etc.) (collectively, main memory 254). In an embodiment, a computing system can include four sockets with each socket connected to four SMBs and each SMB connected to two DIMMs providing a total of 32 DIMMs.

The IOH 256 can connect to PCI endpoints 260A, 260B, and 260C (collectively, 260) via PCIe interconnects. In this example, the PCI endpoint 260A can be a storage controller that connects to the IOH 256 by a PCIe ×4 link, and the PCI endpoints 260B and 260C can be NICs that connect to the IOH 256 via PCIe ×16 links. The IOH 256 can also connect to an ICH 258 by an Enhanced Function Interface (EFI) bus. The ICH 258 can provide connections to a BMC 262 and a boot subsystem 264. One of ordinary skill in the art will appreciate that the computing system 250 can be similar in many respects to the computing system 200. However, the computing system 250 is an example of a full-slot server that can include more overall resources than the computing system 200, a half-slot server. For example, the computing system 250 includes more sockets and cores than the computing system 200, and thus the CPU of the computing system 250 can include more processor elements than the CPU of the computing system 200, more DIMMs or other main memory, and more I/O interfaces. Thus, computing system 250 can have greater processing power, memory, and networking capabilities than the computing system 200. Although the computing systems 200 and 250 illustrate examples of the x86 architecture, other embodiments may utilize other server architectures (e.g., ARM, MIPS, PowerPC, SPARC, other RISC architectures, and/or other Complex Instruction Set Computer (CISC) architectures), and one of ordinary skill in the art can readily apply the principles disclosed in this disclosure to these other architectures.

Figure 3A:
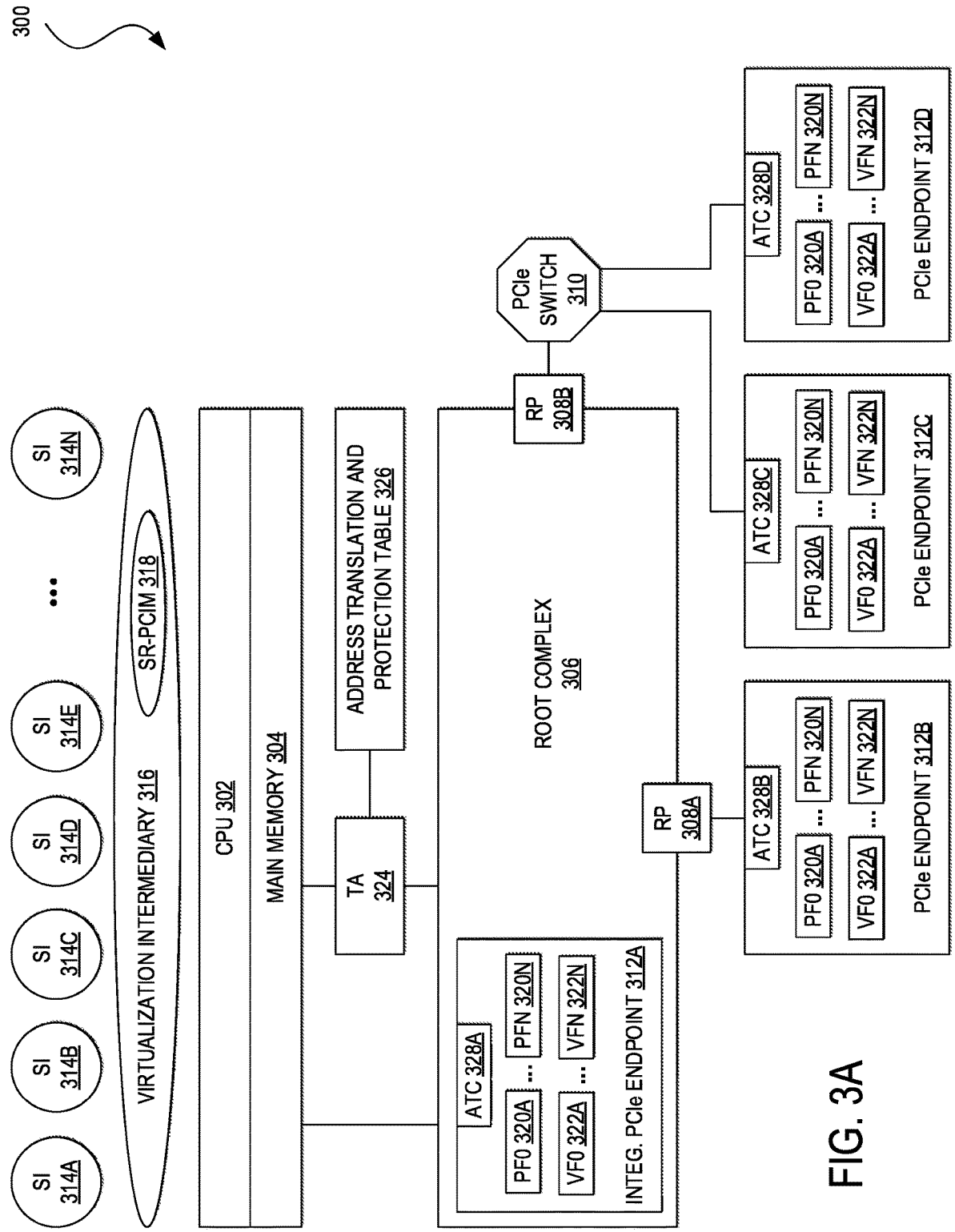
FIG. 3A illustrates a block diagram of an example of a computing system for implementing I/O Virtualization (IOV) and Address Translation Services (ATS) in accordance with an embodiment.

FIG. 3A illustrates a block diagram of an example of a reference architecture of a computing system 300 for implementing I/O Virtualization (IOV) and ATS, as set forth in the PCI Express® Base specification. IOV can provide a mechanism by which a single Physical Function (PF) or physical device can appear to be multiple separate physical functions (e.g., Virtual Functions (VFs)) or devices (e.g., Virtual Devices (VDEVs)) each with their own configuration, including bus number and Base Address Registers (BARs), or more granular, provisioned, device resources (e.g., Assignable Device Interfaces (ADIs) associated PASIDs). IOV can enable a single PF or physical device to be safely shared among multiple system images (e.g., virtual machines, containers, or other virtual partitions of the computing system 300). IOV can also enable the system images to directly interact with VFs or VDEVs and bypass the intermediate virtualization layer (e.g., operating system, hypervisor, container engine, or other virtualization software) for improved I/O performance.

In this example, the computing system 300 (e.g., the computing systems 112, 200, and 250) includes a CPU 302 (e.g., the CPUs 120, 202, and 252), main memory 304 (e.g., the main memory 122, 204, or 254), a PCIe root complex 306 (e.g., the IOHs 206, 256), root ports 308A and 308B (collectively, 308), one or more PCIe switches 310 (e.g., the ICHs 208 and 258), and PCIe endpoints 312A, 312B, 312C, and 312D (e.g., the PCIe endpoints 116, 210, and 260) (collectively, 312). The root complex 306 can represent the root of an I/O hierarchy that connects the CPU 302 and main memory 304 to I/O resources (e.g., the PCIe endpoints 312). A computing system can include one or more root complexes, and a root complex can include at least one host bridge, root port, or integrated endpoint (e.g., the integrated PCIe endpoint 312A). Each root port 308 can correspond to a separate hierarchy domain, and each hierarchy domain may include a single PCIe endpoint 312 (e.g., the PCIe endpoint 312B) or a sub-hierarchy comprising one or more PCIe switches 310 that provide I/O fan-out and connectivity to one or more PCIe endpoints (e.g., the PCIe endpoints 312C and 312D). The PCIe endpoints 312 may be integrated within the root complex 306 (e.g., the PCI endpoint 310A) or they can be distinct components separate from the root complex 306 (e.g., the PCI endpoints 310B, 310C, and 310D).

In some embodiments, the computing system 300 can concurrently execute multiple system images 314A, 314B, . . . , 314N (collectively, 314). The system images 314 can be software, such as a virtual machine, operating system, container, or other virtual partition of a physical server, that can be used to execute applications or services (e.g., I/O device driver). The computing system 300 can also include a virtualization intermediary 316 (e.g., operating system, hypervisor, container engine, or other virtualization software) in between the CPU 302 and main memory 304 and the system images 314. The virtualization intermediary 316 can abstract hardware (e.g., the CPU 302, the main memory 304, the PCIe endpoints 312, etc.) to present each system image 314 with its own virtual system. The actual hardware resources available to each system image 314 may vary based on workload or user-specific policies. Although this can be suitable for some environments, I/O can become a bottleneck in the computing system 300 because of the overhead of the virtualization intermediary 316. To address this problem, IOV can enable the PCIe endpoints 312 and system images 314 to bypass the virtualization intermediary 316 for I/O intensive operations, such as DMA, other memory access (e.g., the local storage 126), interrupt processing, and so forth.

One type of IOV, SR-IOV, can provide a Single Root PCI Manager (SR-PCIM) 318, software for configuring and managing PFs 320A, 320B, . . . , 320N (collectively, 320) and VFs 322A, 322B, . . . , 322N (collectively, 322) in each PCIe endpoint 312. The PFs 320 can be PCIe functions or devices that support SR-IOV and are accessible to the system images 314, the virtualization intermediary 316, or the SR-PCIM 318. The VFs 322 can be light-weight PCIe functions or devices that are directly accessible by the system images 314. Each PF 320 and VF 322 can be assigned a unique Routing ID or PASID for routing Transaction Layer Packets (TLPs). Additional details regarding SR-IOV are set forth in the PCI Express® Base Specification. Other embodiments may also support other IOV technologies, such as Multi-Root IOV, Intel® Scalable IOV, Intel® Virtualization Technology for Directed I/O (VT-d), AMD® I/O Virtualization Technology (AMD®-Vi), and so forth.

ATS can provide a mechanism to enable the system images 314 to perform direct memory access (DMA) transactions to and from the PCIe endpoints 312. This can be achieved by using look-up tables that map virtual addresses that the system images 314 are accessing to physical addresses in the main memory 304. ATS can also enable the PCIe endpoints 312 to perform DMA transactions for memory locations in the computing system 300 using the same mechanism.

ATS can allow the PCIe endpoints 312 to participate in the translation process, and can provide an ATC for the I/O device's own memory accesses. This can offload some of the address resolution processing from the CPU 302 and/or root complex 306 by distributing translation to the PCIe endpoint 312, reduce IOTLB cache thrashing, decrease performance dependency on the size of the IOMMU TLB, and optimize memory access latency by sending a pre-translated requests to the root complex 306.

DMA access time can be significantly lengthened by resolution of the virtual address to an actual physical address. For example, if the PCIe endpoint 312 requires access to a translation table in the main memory 304, the access time can be significantly longer than the time for untranslated access. Additionally, if each I/O transaction requires multiple memory accesses (e.g., for a page table walk), then the memory access rate or overhead associated with DMA can be high. To optimize address resolution, the computing system 300 may include one or more TLBs in entities that perform address translation, such as the CPU 302, the root complex 306, or the PCIe endpoints 312. The PCI Express® Base Specification refers to the TLB in the root complex 306 or the PCIe endpoint 312 as an ATC (sometimes also referred to as a device TLB) to differentiate from the TLB of the CPU.

The computing system 300 can include various elements for supporting ATS, such as a translation agent 324, an address translation and protection table (ATPT) 326, and ATCs 328A, 328B, 328C, and 328D (collectively, 328) in the PCIe endpoints 312A, 312B, 312C, and 312D, respectively. The translation agent 324 can include hardware, firmware, and/or software for translating an address within a PCIe transaction into the associated physical address. In some embodiments, the translation agent 324 can include an ATC to reduce latency for translation table access. The translation agent 324 can also be used to prefetch a translated address before DMA access. The ATPT 326 can store the address translations retrieved by the translation agent 324 to process PCIe requests, such as DMA Read or DMA Write (including writing interrupt requests to memory), among other address translation services. The DMA Read and Write requests can be translated through a combination of the Routing ID (or PASID) and the address included in a PCIe transaction. In some embodiments, the translation agent 324 may be integrated with the root complex 306, an IOMMU can operate as the translation agent 324/root complex 306, and the IOMMU may be integrated in an IOH (e.g., the IOHs 206 and 256).

ATCs can reside in two locations within the computing system 300, within the translation agent 324 (which can be integrated within or sit above the root complex 306), or within the PCIe endpoints (e.g., the ATCs 328). Within the root complex 306, the ATC (not shown) can be used to accelerate translation look ups. Within the PCIe endpoint 312, the ATC 328 can be populated via ATS and can then be used within PCIe transactions to bypass the IOMMU's IOTLB to improve performance without compromising the benefits of the ATPT 326.

Figure 3B:
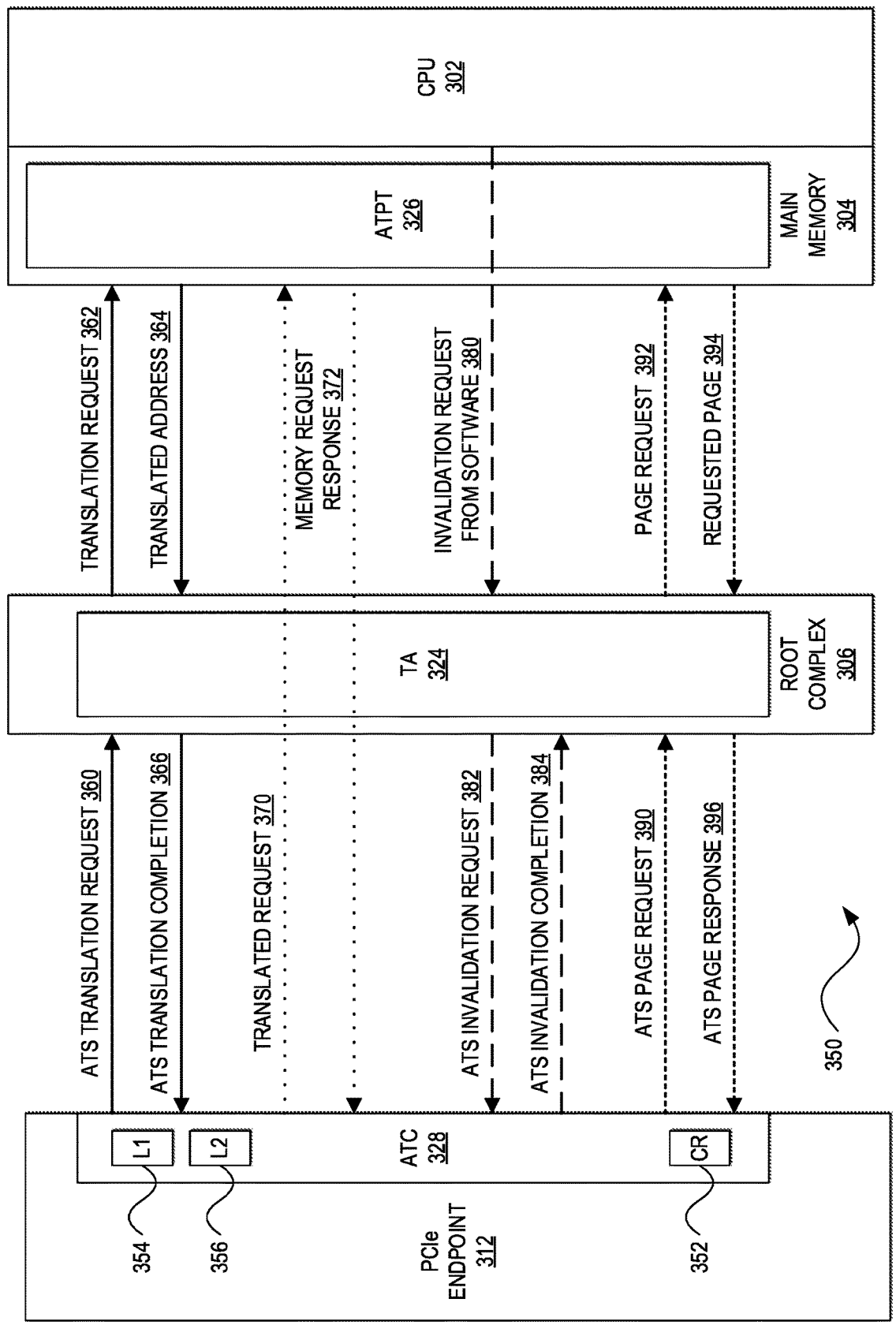
FIG. 3B illustrates a block diagram of an example of a communication protocol for ATS in accordance with an embodiment.

FIG. 3B illustrates a block diagram of an example of a communication protocol 350 enhancing ATS. One of ordinary skill will understood that, for any processes discussed herein, there can be additional, fewer, or alternative steps performed in similar or alternative orders, or in parallel, within the scope of the various embodiments unless otherwise stated. The communication protocol 350 may be performed between the PCIe endpoint 312 and the translation agent 324 integrated within the root complex 306 (collectively, root complex 306). In some embodiments, an IOMMU can operate as the translation agent 324/root complex 306 and the IOMMU may be integrated within an IOH (e.g., the IOHs 206 and 256).

In this example, the PCIe endpoint 312 can include the ATC 328. The ATC 328 can include one or more control registers 352 (e.g., ATS Capability Register, ATS Control Register, Page Request Control Register, Page Request Status Register, Outstanding Page Request Capacity, Outstanding Page Request Allocation, etc.) for enabling ATS configuration. The ATC 328 can also include two levels of caches 354 and 356 that the PCIe endpoint 312 can reference before determining whether to fetch the translated address from the host computing system via ATS.

If there is a miss for a transaction in the first level cache 354, the PCIe endpoint 312 can reference the second level cache 356 to determine whether the transaction is associated with any pinned entries in the second level cache 356 and/or which cache lines may be available for reservation for the I/O transaction. For example, Table 1 below sets forth an example of an implementation of the second level cache 356. The second level cache 356 can include VNIC identifiers, PASIDs, priorities, and regions of the first level of the ATC to reserve for those VNICs and PASIDs. The address, sizes, and counters may be updated at run time.

TABLE 1

Example Level 2 Address Translation Cache

| VNIC | PASID | Start Cache Line | End Cache Line | Priority | Address | Size | Counters |
|---|---|---|---|---|---|---|---|
| 10 | 234562 | 34 | 90 | 0 | | | 0 |
| 14 | 454334 | 91 | 345 | 1 | | | 0 |
| 23 | 567754 | 346 | 900 | 2 | | | 0 |

The second level of the ATC can identify to the NIC the cache lines that are explicitly reserved for VNICs 10, 14, and 23, as shown in Table 1. When the NIC generates the request for the translated address via ATS, the NIC can skip the reserved entries and update the rest of the first level of the ATC by invalidating the entries outside of the reserved regions. This design can ensure that there is room available in the first level of the ATC for non-priority transactions, which can be marked as dirty and invalidated so that non-priority traffic does not get permanently blocked or otherwise provides non-blocking I/O to the non-priority traffic. In any event, if the cache lines in the first level of the ATC are not enough, there may be less harm sending the untranslated transactions to the host computing system as is for low priority network flows. Thus, the ATC can be highly adaptive and configurable to a wide variety of workloads at hyper-scale.

In some embodiments, the communication protocol 350 can comprise a Translation Request 360, a Translation Completion 366, a Translated Request 370, an Invalidation Request 382, an Invalidation Completion 384, a Page Request 390, and a Page Response 396. The Translation Request 360 may be preceded by a work request received by the PCIe endpoint 312, such as data being transmitted to the PCIe endpoint 312 for egress and requiring the PCIe endpoint 312 to read it from the main memory 304 or data being received by the PCIe endpoint 312 for ingress and requiring the PCIe endpoint 312 to write it to the main memory 304. The PCIe endpoint 312 may determine that the ATC 328 has not cached the location to read from or write to in the main memory 304. The PCIe endpoint 312 may also determine that caching the translation within the ATC 328 may be beneficial, such as if the memory address ranges may be frequently accessed over an extended period of time or whose associated buffer content may be subject to a significant update rate. In some embodiments, the Translation Request 360 may be generated in accordance with one or more ATC entry replacement policies (e.g., user-defined, QoS, rate limit, workload-based policies, etc.) and/or an ATC entry replacement algorithm (e.g., deficit weighted round robin (DWRR)).

The Translation Request 360 can be sent upstream through the PCIe hierarchy to the root complex 306. In some embodiments, multiple Translation Requests 360 can be aggregated and then sent at one time to reduce the overhead associated with individual requests. Upon receipt of the Translation Request 360, the root complex 306 can reference the ATPT 326 (at 362) to validate that the PCIe endpoint 312 can access the memory indicated by the Request and fetch the translated address. In this example, the ATPT 326 may be integrated in the main memory 304. The root complex 306 can receive the translated address (at 364), and transmit the Translation Completion 366 with the translated address to the PCIe endpoint 312. The PCIe endpoint 312 can update the ATC 328 with a mapping of the untranslated address and the translated address, and proceed processing the work request with the translated address.

The Translated Request 370 can be similarly preceded by a work request received by the PCIe endpoint 312. However, the PCIe endpoint 312 may instead determine that the ATC 328 has cached the location to write to or read from in the main memory 304, and the PCIe endpoint 312 may fetch the cached translation (e.g., a result of the Translation Completion 366) from the ATC 328. The Translated Request 370 can operate as a regular read or write request to the main memory 304 using the cached translation, and the main memory 304 can respond (at 372) with data in the case of a read request or an indication of a successful write in the case of a write quest.

When a translation is changed in the ATPT 326 (e.g., because the translation is stale or determined to be invalid for other reasons), the root complex 306 may receive an invalidation request from software (at 380) and send the Invalidation Request 382 to the ATC 328 to maintain proper synchronization between the ATPT 326 and the ATC 328. The Invalidation Request 382 can be used to clear a specific subset of the address range from the ATC 328. After the PCIe endpoint 312 completes the Invalidation operation (at 384), the PCIe endpoint 312 can send the Invalidation Completion 386.

The Page Request 390 may be preceded by the PCIe endpoint 312 determining that it requires access to a page for which an ATS translation is not available. The PCIe endpoint 312 can cause the Page Request 390 to be sent to the root complex 306 (e.g., via a request to a Page Request Interface). The Page Request 390 can include a page address and a Page Request Group (PRG) index. The PRG index may be used to identify the transaction and to match requests with responses.

After the root complex 306 determines its response to the request (e.g., to fetch the pages from the ATPT 326 (at 392) and to make the requested page resident (at 394)), the root complex 306 can send a Page Response 396 back to the PCIe endpoint 312. The PCIe endpoint 312 can then employ ATS to request a translation for the requested page(s).

Figure 4:
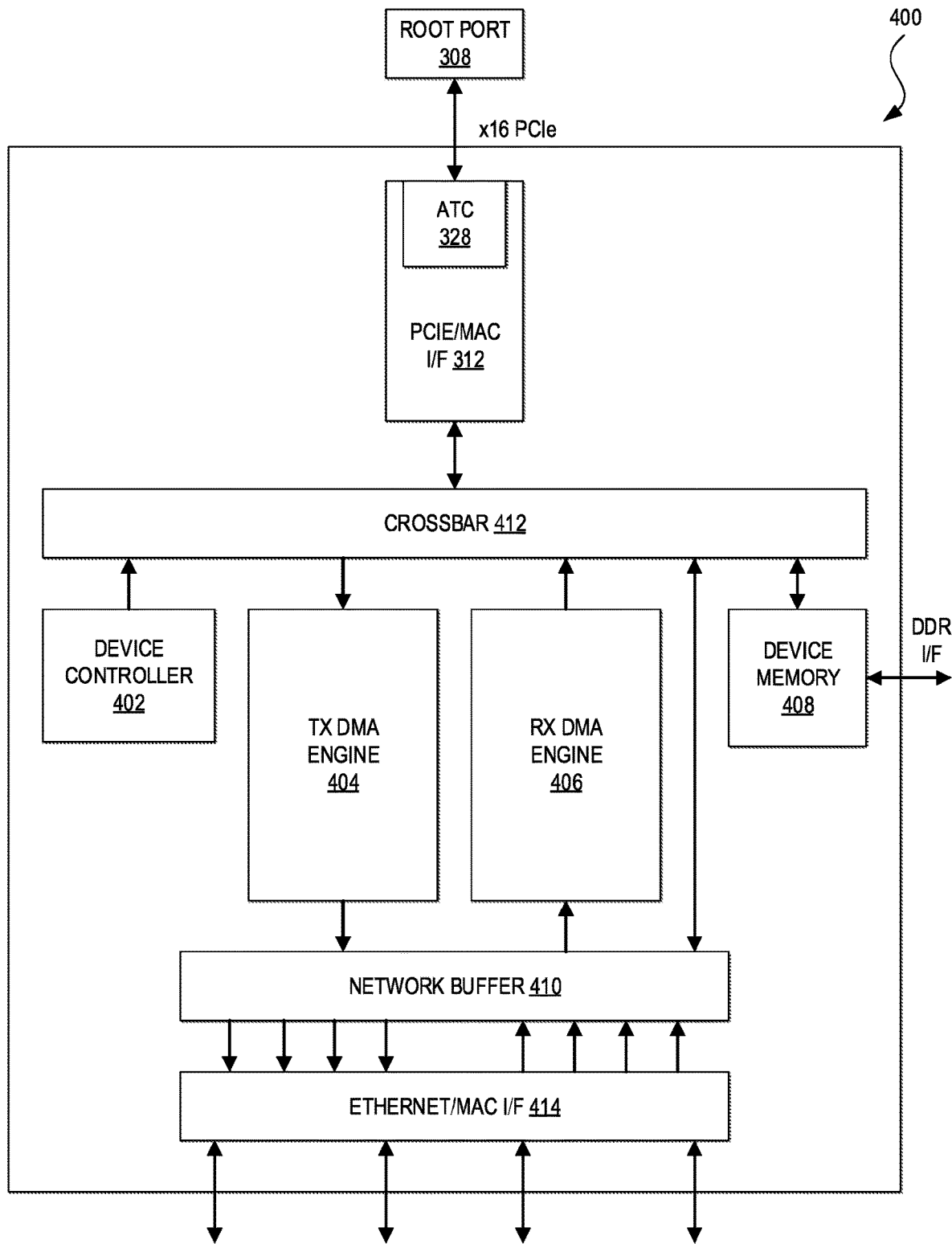
FIG. 4 illustrates a block diagram of an example of a network interface controller in accordance with an embodiment.

FIG. 4 illustrates a block diagram of an example of a NIC 400 that can be utilized for implementing one embodiment of the present disclosure. In this example, the NIC 400 includes the PCIe/Media Access Control (MAC) interface 312, a device controller 402, a Transmit direct memory access (DMA) engine 404, a Receive DMA engine 406, device memory 408, and a network buffer 410, each of which may be interconnected by a crossbar 412. The PCIe port 312 can include the ATC 328 and can connect to the root port 308 by PCIe ×16 links.

The DMA engines 404 and 406 can be directed by the device controller 402 to read and write data between local memory (e.g., the device memory 408, the network buffer 410) and a host computing system's memory. In some embodiments, the DMA engines 404 and 406 can offload various network and packet processing tasks from the host computing system's CPU, such as remote DMA over Converged Ethernet (RoCE) offload; Transport Control Protocol (TCP), User Datagram Protocol (UDP), and Internet Protocol (IP) stateless offload or other network protocol processing; large send offload (LSO), large receive offload (LRO), checksum offload; receive side scaling (RSS), transmit side scaling (TSS), Virtual Extensible Local Area Network (VXLAN) or MPLS tagging, receive flow steering; Intel® Data Plane Development Kit (DPDK), Open Virtual Switch (OVS) offload, flow table matching, tunnel encapsulation/decapsulation, and encryption/decryption, among others. The device memory 408 can include a DDR interface for adding additional device memory, and can be used for temporary storage of frames, buffer descriptors, and other control data.

The NIC 400 can also include an Ethernet/MAC interface 414 connected to the network buffer 410 on one end and one or more network devices (e.g., the port extenders 114, the switches/routers 108, etc.) (not shown) on the other end via one or more Ethernet links (e.g., 1 GbE, 10 GbE, 25 GbE, 40 GbE, 50 GbE, 100 GbE, 200 GbE, etc.). The Ethernet/MAC interface 414 can interact with the device controller 402 to receive frames into the network buffer 410 and to send frames from the network buffer 410 out onto the network.

In some embodiments, the NIC 400 can be a programmable NIC and include one or more programmable elements (e.g., ASICs, field programmable gate arrays (FPGAs), etc.) that can run compiled-code firmware.

The ATC can be used by the NIC to fetch translated physical addresses of a host computing system (e.g., the computing systems 112, 200, 250, 300, etc.) for a given untranslated address to reduce memory access latency that may otherwise be required to retrieve the translated address for a given I/O transaction. Depending upon the size of the payload supported by the NIC, latency of the transaction can vary in the event that the ATC is thrashing. For example, if the NIC supports only 256B of the maximum payload and has to transfer 9 KB of data to its host computing system (e.g., a virtualized system where the IOMMU is enabled), then there may be up to 36 transactions sent by the NIC to the host computing system under maximum load. Each transaction can involve a write to an untranslated address in the main memory of the computing system that may require the IOMMU to determine the physical address mapped to the untranslated address. If the address is not cached and not present in the IOTLB, the IOMMU may be required to walk page tables to determine the corresponding physical address that the NIC can use to write the payload to the destined address. This can incur substantial latency and degrade overall throughput even when the NIC is performing large transfers.

To reduce memory access latency, ATS can allow PCIe endpoints to incorporate their own ATCs. This can improve performance to an extent for a moderate level of workloads but may be ineffectual at hyper-scale (e.g., in the order or thousands). With the roll-out of PASIDs, a computing system is expected to run more than a thousand system images (e.g., virtual machines, containers, or other virtual partitions of the computing system) at the same time. This can put tremendous pressure on the ATC. As the flows targeted to different system images may have different address domains and different PASIDs, the conventional ATC may suffer from cache thrashing and the overall system can experience severe throughput loss (e.g., a substantial number of I/O transactions may be throttled during the course of address resolution). These and other deficiencies of the prior art may be overcome by optimizing utilization of the ATC by defining ATC entry replacement policies based on user preference, QoS, and rate limits, among other criteria.

Figure 5:
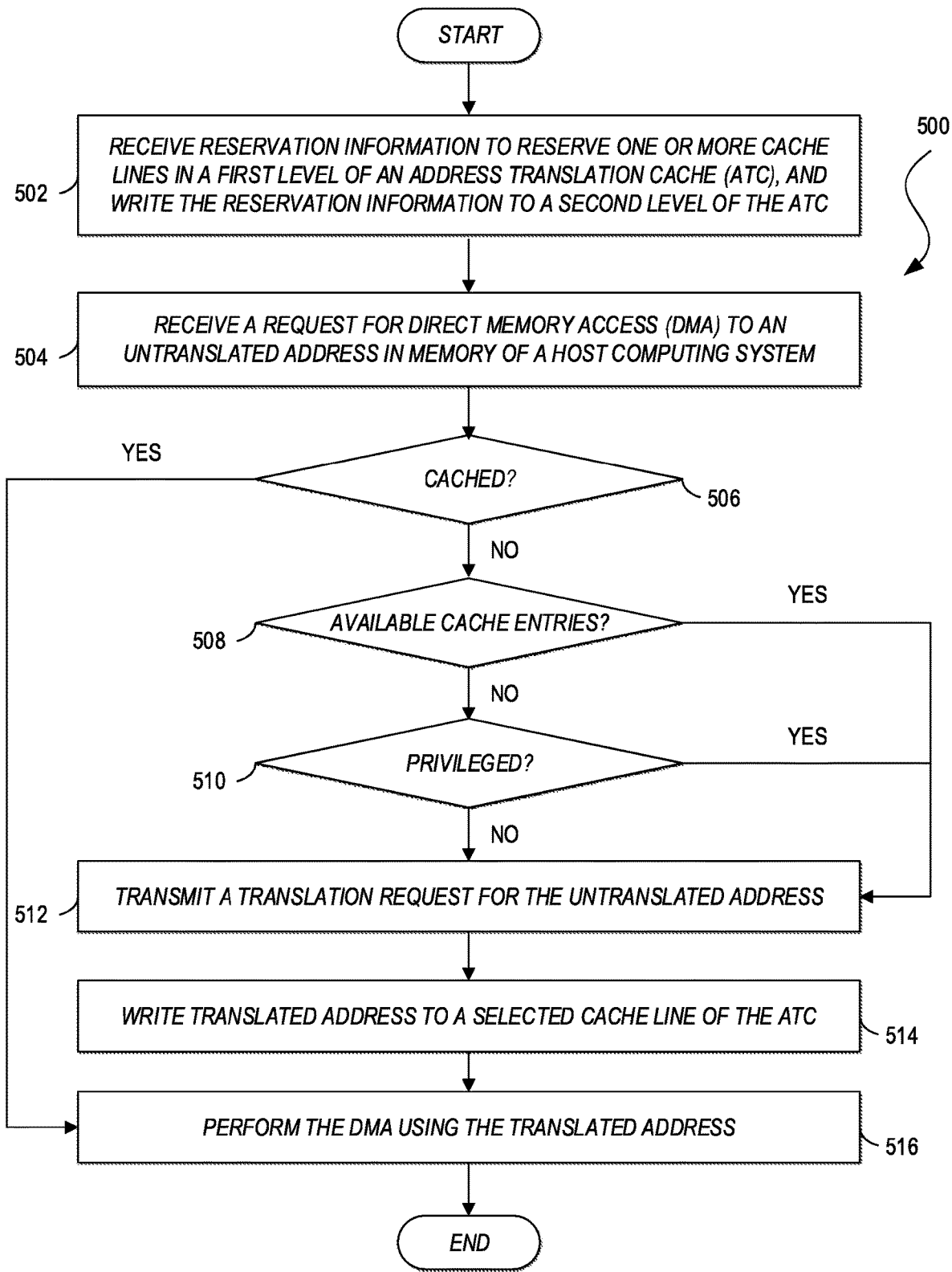
FIG. 5 illustrates a sequence diagram of an example process for optimizing utilization of an address translation cache in accordance with an embodiment.

FIG. 5 illustrates a flow chart of an example process 500 for optimizing utilization of an ATC for a network I/O device. The process 500 may be performed at least in part by a NIC (e.g., the NIC 400) and an I/O subsystem (e.g., the I/O subsystems 124, the IOHs 206 and 256, the root complexes 306, the translation agent 324, an IOMMU, etc.). The NIC can include an ATC (e.g., the ATCs 328) or device TLB, and the I/O subsystem can include an IOTLB or ATC.

The process 500 may begin at step 502 in which the NIC can receive reservation information to reserve one or more cache lines in a first level of the ATC (e.g., a first discrete ternary content-addressable memory (TCAM) or a first segment of a discrete ATC TCAM), and write the reservation information to a second level of the ATC (e.g., a second discrete TCAM or a second segment of the discrete ATC TCAM). The reservation information can include at least identifying information (e.g., VNIC identifier, PASID, L2-L7 data, etc.) and the reserved ATC entries or cache lines. In some embodiments, the reservation information can also include priority information and other metadata for the entries in the second level of the ATC.

In some embodiments, the second level of the ATC may be populated by a network management system (e.g., Cisco DNA™ Center, Cisco® SD-WAN vManage, Cisco ACI™, Cisco® Application Policy Infrastructure Controller (APIC), Cisco Meraki™ or Meraki® Dashboard, Cisco UCS® Manager, etc.) based on one or more ATC entry replacement policies. The ATC entry replacement policies may be automatically generated or may be based on user configuration. For example, a user may request the network management system to prioritize traffic based on a MAC address, and the network management system can determine the VNIC identifiers and PASIDs associated with that MAC address and a number of cache lines in the first level of the ATC to reserve for those VNIC identifiers and PASIDs. The network management system can write the reservation information to the second level of the ATC. In some embodiments, the reservation information may be located in storage (e.g., local storage of the host computing system, local storage of the NIC, remote storage, etc.), and can be retrieved and written to the second level of the ATC, such as at boot-up of the host computing system.

In some embodiments, the ATC entry replacement policies may be defined by QoS classes (e.g., Class of Service (CoS); IP Type of Service (ToS); IP Precedence (IPP) 0-7; Differentiated Services Code Points (DSCPs) and Per-Hop Behaviors (PHBs), such as Best Effort (BE or DSCP 0), Internet Engineering Task Force (IETF) Request for Comments (RFC) 2474 Class Selectors (CS) 1-7, RFC 2597 Assured Forwarding PHBs (AFxy), RFC 3268 Expedited Forwarding (EF), IP Explicit Congestion Notification (IP ECN), and so forth. A QoS management system or other suitable software can carve out regions of the first level of the ATC to prioritize traffic in accordance with the defined QoS classes and write the carve-outs to the second level of the ATC. For example, the user can define QoS classes that allocate more of the first level of the ATC and give more weight to the flows which are no drop Ethernet and Fibre Channel (FC) so that those flows will not get invalidated when they are active at any given time. If there is contention for the first level of the ATC reserved for a particular QoS class, then the NIC may use LRU, DWRR, or other suitable algorithm to determine which first level ATC entries reserved for that QoS class to evict. QoS can also define a minimum amount of bandwidth to allocate all traffic flowing through the NIC. For example, the QoS management system or other software can carve out the first level of the ATC to prevent starvation due to invalidation of first level ATC cache lines, and write the carve-outs to the second level of the ATC.

In some embodiments, rate limits may dictate ATC entry replacement policy. Rate limitations can generally limit the amount of bandwidth that can be consumed over a period of time, and these limitations may be used as criteria to carve out the first level of the ATC. For example, low bandwidth utilization flows may accommodate smaller regions in the first level ATC. The determination of the carve-outs of the first level of the ATC can be made by software to resolve conflicting policies and to prevent starvation due to static partitioning of the first level of the ATC.

After the second level of the ATC is populated with the reservation information, the process 500 may continue to step 504 in which the NIC may receive an indication to read from or write to the main memory of the host computing system. For example, an ingress or egress unit of the NIC (e.g., the receive and transmit direct memory access (DMA) engines 404 and 406) may generate an I/O transaction (e.g., the Translation Request 360) or DMA transaction to retrieve from or write to an untranslated address provided by a device controller of the NIC (e.g., the device controller 402), an IOMMU of the host computing system, software running on the host computing system, and so forth. In one embodiment, the NIC may receive external network data to an Ethernet interface (e.g., the Ethernet interface 414), which can be processed by the receive DMA engine. When processing is complete, the receive DMA engine may generate an I/O request to transmit the processed data to the untranslated address. In another embodiment, the egress DMA engine can receive an indication that there is data available in the main memory of the host computing system, and the egress DMA engine can generate an I/O request to fetch the data using the untranslated address.

At decision block 506, the NIC can reference a first level of the ATC to determine whether the untranslated address has been cached. For example, the ingress/egress unit may send the I/O transaction to a PCIe interface (e.g., the PCIe interface 312) of the NIC which can prompt the NIC to search the first level of the ATC. If the untranslated address is cached, the NIC may fetch the translated address from the first level of the ATC, and the process 500 may proceed to step 516.

If the untranslated address is not cached in the first level of the ATC, the process 500 may proceed to decision block 508 in which the NIC may determine whether there are any available entries in the non-privileged regions of the first level of the ATC to overwrite and select from among these entries if available. For example, there may be empty entries in the first level of the ATC or invalidated ATC entries. If so, the NIC may select from among the available entries of the first level of the ATC (e.g., random, Least Recently Used (LRU), deficit weighted round robin (DWRR), or other suitable algorithm), and the process 500 may proceed to step 516.

If there are no available entries in the first level of the ATC to write into, then the NIC may continue onto decision block 510 and query the second level of the ATC to determine whether the current I/O transaction is associated with any reserved or pinned entries in the second level of the ATC. For example, the second level of the ATC may include a VNIC identifier, a PASID, and start and end cache lines indicating the portions of the first level of the ATC that have been pinned or reserved for each VNIC identifier and PASID. The NIC may utilize the VNIC identifier and the PASID of the current I/O transaction to determine if they match any entries in the second level of the ATC. In other embodiments, the second level of the ATC may store other data for classifying traffic (e.g., L2-L7 data) depending on the hardware capabilities of the NIC, and the NIC may be able to retrieve corresponding data from the current I/O transaction. In still other embodiments, the NIC may utilize other identifying information of the current I/O transaction to match with the entries of the second level of the ATC. If the current I/O transaction matches an entry in the second level of the ATC, then the NIC can select an entry in the first level of the ATC to evict from among the cache lines associated with the matching VNIC identifier and PASID in the second level of the ATC, and the process 500 may proceed to step 512. In some embodiments, the NIC may apply Least Recently Used (LRU) or other suitable algorithm (e.g., deficit weighted round robin (DWRR)) for this selection.

If the current I/O transaction is not associated with any pinned or reserved entries of the first level of the ATC (e.g., the current I/O transaction is not a privileged transaction), then the NIC may select an entry in the non-privileged region of the first level of the ATC for eviction, and the process 500 may proceed to step 512. In some embodiments, the NIC may apply Least Recently Used (LRU) or other suitable algorithm (e.g., deficit weighted round robin (DWRR)) for the selection.

At step 512, the NIC may generate a Translation Request to retrieve the translated address for the current I/O transaction, and the process 500 may proceed to step 514. At step 514, the NIC may cache information mapping the untranslated address to the translated address to the first level of the ATC at a selected entry, and the process may proceed to step 516. In other words, the NIC can evict or overwrite the selected entry of the first level of the ATC with the mapping of the untranslated address to the translated address based on the ATC replacement policies written to the second level of the ATC in step 502.

At step 516, the NIC may perform the DMA using the translated address (e.g., the Translated Request 370 or a regular read/write to the host memory), and the process 500 may be concluded following an indication that the DMA succeeded (e.g., the Translation Completion 366 or other indication that read/write to the host memory was successful). In this manner, the NIC can enforce ATC entry replacement policies to more intelligently select the entries in the first level of the ATC to evict if necessary, and ensure performance and utilization for a privileged set of VNIC identifiers, PASIDs, or other identifiable prioritized traffic.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
in response to an untranslated address not existing in a first level of cache of an address translation cache (ATC), determining whether the untranslated address is associated with one or more pinned entries in a second level of cache of the ATC;
in response to the untranslated address not being associated with the one or more pinned entries in the second level of cache of the ATC, determining one or more reserved regions of the first level of cache associated with the one or more pinned entries;
updating the first level of cache of the ATC to invalidate any entries not included in the one or more reserved regions;
transmitting a translation request to retrieve a translated address associated with the untranslated address;
in response to the translation request being validated to access memory storing the translated address, receiving the translated address; and
updating, at the first level of cache of the ATC, a mapping of the translated address with the untranslated address.

2. The method of claim 1, wherein the translation request is an aggregate of a plurality of translation requests.

3. The method of claim 1, further comprising:
in response to a change in a translation of the translation address, receiving an invalidation request; and
clearing a subset of an address range in the ATC.

4. The method of claim 1, wherein the translation request is a read or write request from the memory.

5. The method of claim 1, further comprising:
in response to determining that the ATC requires access to a page which is unavailable, transmitting a page request; and
receiving the page from memory.

6. The method of claim 5, wherein the page request included at least a page address or a page request group index.

7. The method of claim 5, wherein the page is received via a root complex.

8. At least one non-transitory computer readable medium, storing instructions, which when executed cause at least one processor to:

in response to an untranslated address not existing in a first level of cache of an address translation cache (ATC), determine whether the untranslated address is associated with one or more pinned entries in a second level of cache of the ATC;

in response to the untranslated address not being associated with the one or more pinned entries in the second level of cache of the ATC, determine one or more reserved regions of the first level of cache associated with the one or more pinned entries;

update the first level of cache of the ATC to invalidate any entries not included in the one or more reserved regions;

transmit a translation request to retrieve a translated address associated with the untranslated address;

in response to the translation request being validated to access memory storing the translated address, receive the translated address; and update, at the first level of cache of the ATC, a mapping of the translated address with the untranslated address.

9. The at least one non-transitory computer readable medium of claim 8, wherein the translation request is an aggregate of a plurality of translation requests.

10. The at least one non-transitory computer readable medium of claim 8, further comprising:

in response to a change in a translation of the translation address, receiving an invalidation request; and clearing subset of an address range in the ATC.

11. The at least one non-transitory computer readable medium of claim 8, wherein the translation request is a read or write request from the memory.

12. The at least one non-transitory computer readable medium of claim 8, further comprising:

in response to determining that the ATC requires access to a page which is unavailable, transmitting a page request; and receiving the page from memory.

13. The at least one non-transitory computer readable medium of claim 12, wherein the page request included at least a page address or a page request group index.

14. The at least one non-transitory computer readable medium of claim 12, wherein the page is received via a root complex.

15. A system comprising:

an endpoint comprising an address translation cache (ATC);

a root complex; and a memory, the system configured to:

in response to an untranslated address not existing in a first level of cache of an address translation cache (ATC), determine whether the untranslated address is associated with one or more pinned entries in a second level of cache of the ATC;

in response to the untranslated address not being associated with the one or more pinned entries in the second level of cache of the ATC, determine one or more reserved regions of the first level of cache associated with the one or more pinned entries;

update the first level of cache of the ATC to invalidate any entries not included in the one or more reserved region;

transmit, from the ATC to the memory via the root complex, a translation request to retrieve a translated address associated with the untranslated address;

in response to the translation request being validated to access the memory storing the translated address, receive, from the memory via the root complex to the endpoint, the translated address; and update, at the first level of cache of the ATC, a mapping of the translated address with the untranslated address.

16. The system of claim 15, wherein the system is further configured to:

in response to a change in a translation of the translation address, receive an invalidation request; and clear subset of an address range in the ATC.

17. The system of claim 15, wherein the system is further configured to:

in response to determining that the ATC requires access to a page which is unavailable, transmitting a page request; and receiving the page from memory.

18. The system of claim 17, wherein the page request included at least a page address or a page request group index.

* * * * *